United States Patent [19]

Wolf

[11] 3,866,054
[45] Feb. 11, 1975

[54] DEFECT SIZE DISCRIMINATOR CIRCUIT FOR WEB INSPECTION SYSTEM

[75] Inventor: William Edward Wolf, Newark, Del.

[73] Assignee: E. I. duPont de Nemours and Company, Wilmington, Del.

[22] Filed: Sept. 28, 1973

[21] Appl. No.: 401,905

[52] U.S. Cl. .................... 250/562, 250/563
[51] Int. Cl. ............................ G01n 21/30
[58] Field of Search .......... 250/206, 559, 562, 563, 250/572, 223; 209/111.7

[56] References Cited
UNITED STATES PATENTS

| | | | |
|---|---|---|---|
| 2,812,447 | 11/1957 | MacMartin | 250/563 |
| 3,020,033 | 2/1962 | McCreanor | 250/562 |
| 3,124,289 | 3/1964 | Lynch | 250/562 |
| 3,158,748 | 11/1964 | Laycak | 250/563 |
| 3,317,734 | 5/1967 | Martin | 250/562 |
| 3,347,131 | 10/1967 | Claver | 250/559 |
| 3,601,615 | 8/1971 | Maeda | 250/562 |

Primary Examiner—Archie R. Borchelt
Assistant Examiner—D. C. Nelms

[57] ABSTRACT

A discriminator circuit useful for detecting and extracting corresponding oversized hole- and clump-related web defect signals from a noisy product scan signal utilizes two signal switched integrators operating in parallel for separately processing the hole- and clump-related signals. Primary and secondary thresholds are used to discriminate the two defect types in order that independent defect size criteria can be applied Furthermore, each type of defect undergoes dual character discrimination so that, for each type of defect, alarm and count is made only when the defect exceeds not only a prescribed intensity (clarity of hole or density of clump) but also a prescribed size.

3 Claims, 10 Drawing Figures

DEFECT SIZE DISCRIMINATOR CIRCUIT FOR WEB INSPECTION SYSTEM

BACKGROUND OF THE INVENTION

This invention relates to an inspection system for detecting defects in webs and is more particularly concerned with a size discriminator circuit for use in detecting oversized holes, fibrous clumps, and pattern irregularities in fibrous webs. The device is especially useful for but not limited to detecting such defects in nonwoven fabrics produced by treating fibrous webs with high energy liquid streams as disclosed in Evans U.S. Pat. No. 3,485,706, issued Dec. 23, 1969. Typical nonwoven fabrics of this type are characterized by a network or lacelike pattern comprising dense areas of entangled fibers and areas of lesser density or actual holes, often arranged in intricate patterns. For this type of nonwoven fabric it is particularly important to be able to differentiate that which represents an undesirable defect from that which represents variation due to pattern or represents a defect which is too small to be objectionable to the naked eye. The present invention accomplishes this by providing a detection recognition system which is based not only on the optical intensity of the defect but also on its size. More particularly, the invention permits the inspection system to simultaneously and separately analyze oversized hole and clump defects in fibrous webs.

SUMMARY OF THE INVENTION

In a flying spot inspection system for web materials that includes a radiation source, a means for traversing a beam of radiation from said source in a scan across the web, and electronic means responsive to said beam of radiation in the transmission mode with respect to said web for detecting defects of the nature of fiber clumps and oversized holes in the web and providing output signals representative thereof, said signals having AC and DC components, the improvement comprising: a size discriminator circuit coupled to said electronic means, said circuit including means for extracting the DC component of said signal and providing an AC signal output; parallel connected comparator means for processing said AC signal output and producing two sets of logic pulse output signals, one set of the logic output signals resulting from said AC signal output values exceeding a positive preset primary threshold value, the other set of logic output signals resulting from said AC signal output values exceeding a negative preset primary threshold value; a first signal switched integrator coupled to one of the comparators and operated by said one set of logic signals for accumulating values according to the time-amplitude product areas contained within said one set of logic output signal pulses and for producing an integrated output signal having amplitude values related to the duration of each logic signal of said one set; a second signal switched integrator coupled to the other comparator and operated by said other set of logic output signals for accumulating values according to the time-amplitude product areas contained within said other set of logic output signal pulses and for producing an integrated output signal having amplitude values related to the duration of each logic signal of said other set and means for separately comparing the amplitude values of said integrator output signal with preselected signal secondary threshold values and signalling when said amplitude values of said integrated output signal exceeds said preselected secondary threshold values.

DETAILED DESCRIPTION OF THE PREFERRED EMBODIMENT

Figure 1:
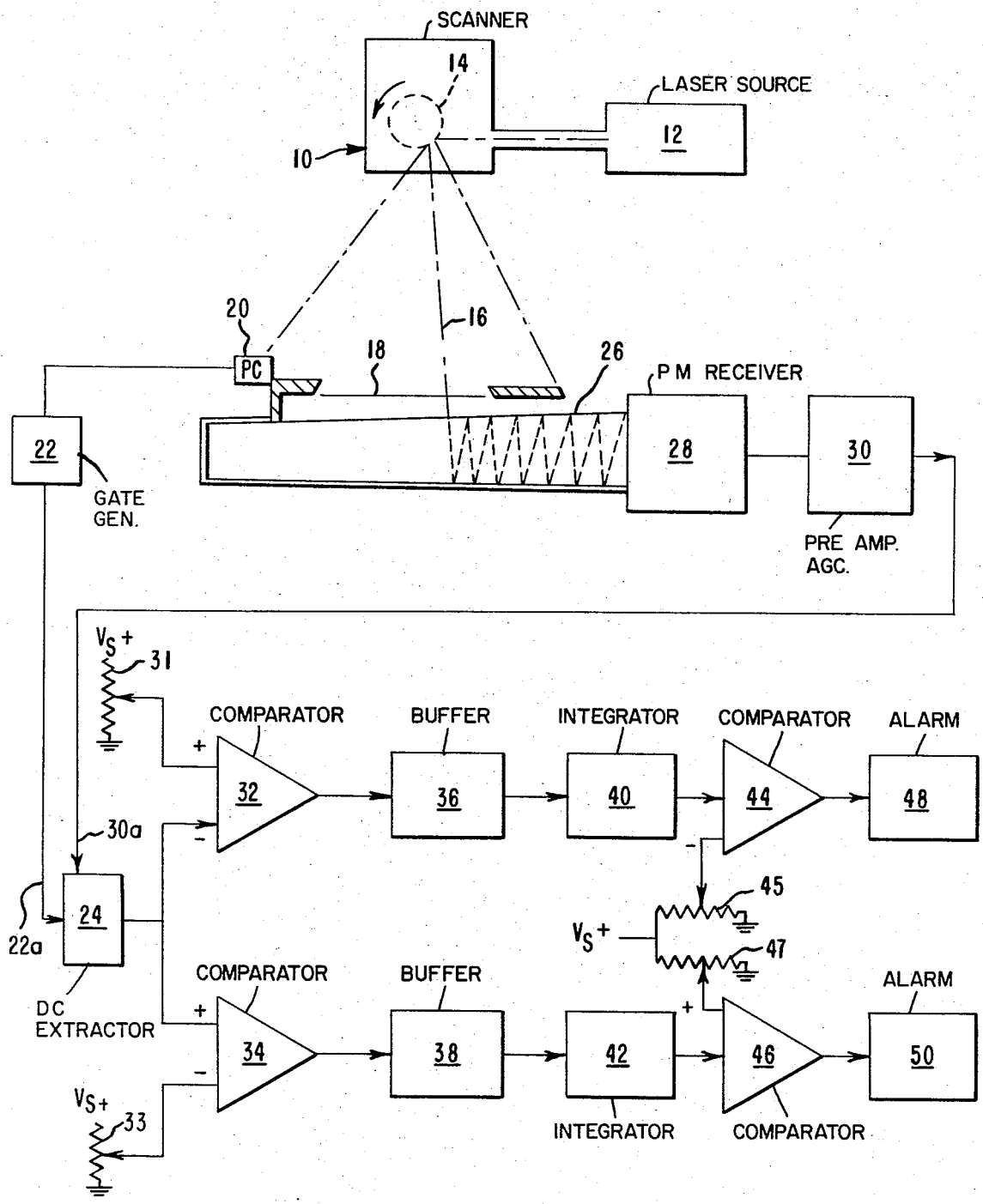
FIG. 1 is a block diagram of the web inspection system.

Referring to FIG. 1, the flying spot scanner chosen for purposes of illustration is denoted generally as 10 and includes a laser source 12 directed at a multifaceted rotating mirror reflector 14 which with associated beam-forming optics (not shown) produces a highly collimated scanning radiation beam. This beam 16 sweeps a spot of radiation transversly across the running product web 18 at a high enough velocity to ensure that successive scans overlap sufficiently for complete product inspection.

At the start of each scan, the beam passes over photocell 20 which in turn is connected to gate generator 22 which operates DC extractor 24.

Figure 4A:
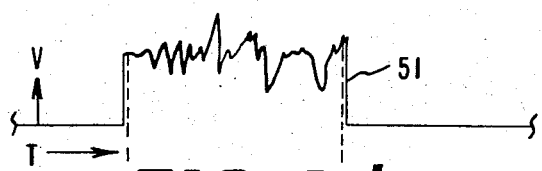
FIGS. 4a–d' are representations of the signal wave forms existing in particular parts of the circuitry of the inspection system.
Figure 4A:
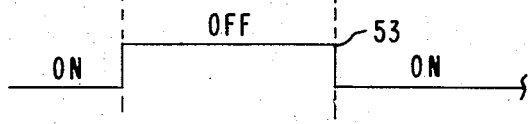
Figure 4B:
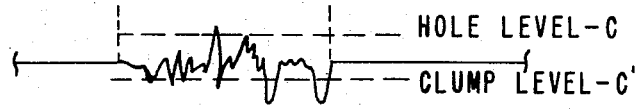
Figure 4C:
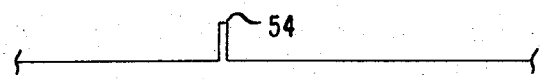
Figure 4C:
Figure 4D:
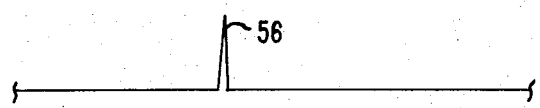
Figure 4D:
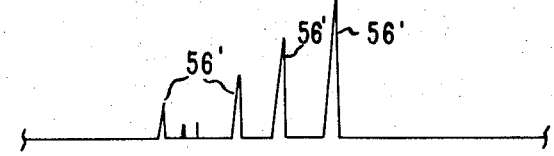

A radiation conducting rod 26 conveys transmitted (shown) or reflected radiation from the beam to a photomultiplier (PM) receiver 28. As shown in the drawing the output of PM-28 or the product signal is fed to preamplifier-AGC circuit 30 then passed to DC extractor 24 which removes the DC component of the pedestal signal generated in PM-28 and which has been amplified and regulated in preamplifier-AGC circuit 30. The product signal wave forms, i.e., with and without the DC pedestal are shown in FIGS. 4a and 4b. The remaining AC zero-based signal (FIG. 4b) passes simultaneously through comparators 32,34 which can be National Semiconductor type LM-211D. The comparators 32,34 are connected to separate circuits for processing their outputs. For example the output of comparator 32 consists of logic pulses corresponding to signals whose amplitudes exceed a positive preset primary threshold value established by potentiometer 31 connected to comparator 32. Similarly the output of comparator 34 are logic pulses corresponding to signals whose amplitudes exceed a negative preset primary threshold value established by potentiometer 33. These logic output signals are then fed to buffer amplifiers 36,38 (Philbrick type 1322) to prevent loading of comparator output circuits and then on to signal switched integrators 40,42 for accumulating time-amplitude product values contained within the individual logic pulses. Comparators 44,46 connected to integrators 40,42 respectively compare the output voltage values of the integrators with secondary threshold values set to predetermined values by potentiometers 45,47 associated with respective comparators 44,46. When the integrated signal amplitude values exceed the preset secondary threshold levels, the comparator 44,46 outputs are used to operate defect alarm and counting means 48,50. The alarm and counting means may be one of the known types such as a Sedeco Printer/Counter. The dual comparator arrangement described above permits separate and simultaneous analization of both the oversized hole- and clump-related output signals.

Figure 2:
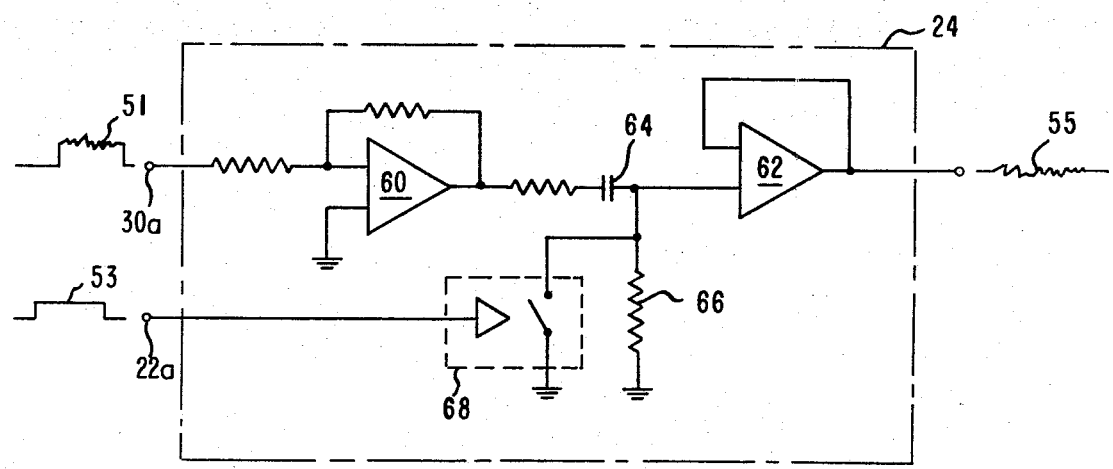
FIG. 2 is a schematic diagram of the DC extractor shown in FIG. 1.

An included feature of this invention is the use of DC extractor 24 which provides a means for removing the DC component of the signal shown in FIG. 4a without introducing spikes caused by differentiating the leading and trailing edges of the signal. Such spikes would introduce unwanted signals to comparators 32, 34. A schematic of the circuitry of the DC extractor 24 is shown in FIG. 2. The circuit includes an amplifier 60 (e.g., National Semiconductor (OP. AMP LH0062C), coupled to a follower 62 (e.g., National Semiconductor (OP. AMP LH0062C), by means of charging circuit composed of capacitor 64, resistor 66 connected between the capacitor 64 output terminal and ground and an analog switch 68 (e.g., Crystalonics Inc. type CAG-30) connected around resistor 66 to shunt it to ground when the switch is closed. Switch 68 is actuated by a gating signal 53 transmitted over line 22a from gate generator 22 for a period of time that begins very shortly after the leading edge of the signal pulse 51 is detected and ends shortly before the pulse 51 drops to zero (FIGS. 4a and 4a').

The DC extractor operates in the following manner: Amplifier 60 amplifies the stepped signal 51 on 30a and sends the signal through capacitor 64. The spike produced by the differentiation of the amplified signal 51 leading edge by the action of capacitor 64 bypasses resistor 66 to ground through analog switch 68 rather than appearing at the input of follower 62. Switch 68 remains closed until opened by the presence of gating signal 53 which occurs at the instant the spike condition has subsided. As long as switch 68 remains open, the AC components of signal 51 will appear at the input of follower 62 to produce the purely AC output signal 55 (also shown by FIG. 4). The charge accumulated by capacitor 64 during the period switch 68 was closed effectively blocks the DC component of signal 51 from appearing in output signal 55. Gating signal 53 terminates just prior to the arrival of the signal 51 trailing edge, thereby closing switch 68 to short the trailing edge spike to ground and reestablish the zero volt base level for follower 62. In this manner, the DC extractor allows the signal 55 to be zero based without introducing spikes at the terminal points as would be the case when using a standard high pass filter circuit.

Figure 3:
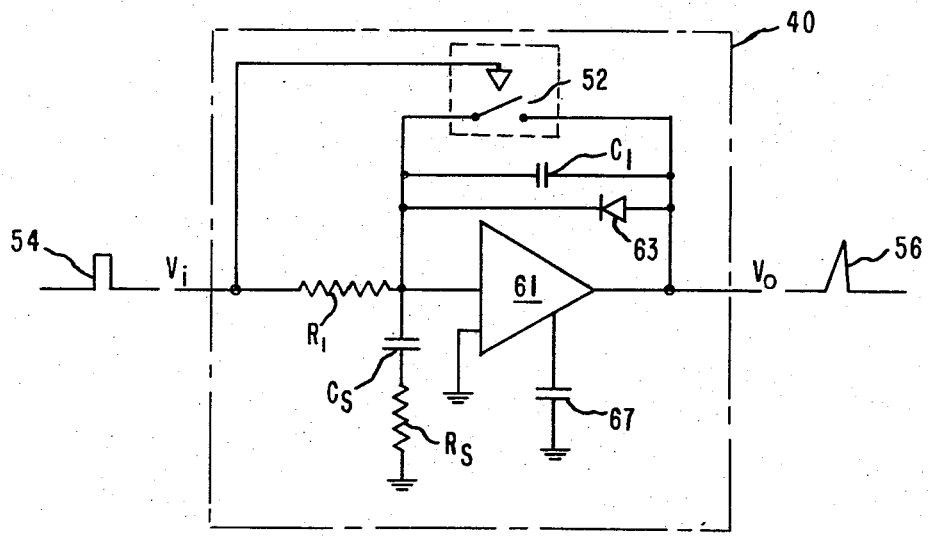
FIG. 3 is a schematic diagram of the signal switched integrators of FIG. 1.

Another feature of this invention is the use of signal switched integrators 40,42 which enable the detection of pulses quite close together without interference. A schematic of the signal switched integrators used in this invention is shown in FIG. 3. The integrator incorporates analog switch 52 which limits integration time to the duration of each logic input pulse 54 to produce triangular pulse 56. The integrator circuit has a transfer function of $$V_o = \frac{1}{R_1 C_1} \int_0^T V_i dt$$

where resistor $R_1$ and capacitor $C_1$ set the gain and time constant of the circuit and determine the voltage output ($V_o$) for a given time and voltage input ($V_i$). Diode 63 connected across amplifier 61 prevents the output voltage from exceeding, in this case, 5.6 volts. This is important in order to prevent the amplifier from operating in the saturation region. Additionally, diode 63 prevents damage to analog switch 52 by limiting the current operating therethrough. Capacitor $C_s$ and resistor $R_s$ provide circuit stablilization and capacitor 67 adjusts the amplifier frequency response for optimum performance. In operation, when pulse 54 goes high it opens switch 52 and capacitor $C_1$ charges linearly until pulse 54 drops off and goes to its low state at which time, switch 52 closes discharging capacitor $C_1$ to zero volts. In this manner the integrator integrates only when the pulse 54 is present. Since the reset time of the integrators 40,42 is quite fast (about 100 nanoseconds) these can integrate discrete pulse signals in rapid sequence without producing distorted output values.

The operation is best shown in conjunction with FIGS. 4a–4d'. A laser flying spot scanner arrangement (FIG. 1) produces a radiation beam 16 which sweeps across a moving product web 18. The transmitted (shown) or reflected (not shown) radiation is conveyed by the light conducting rod 26 to PM-28. The transduced electrical signal (4a) after amplification and regulation by preamplifier-AGC circuit 30 then passes to DC extractor 24 which removes the DC component of the pedestal signal leaving an undistorted zero-based product signal (4b) which passes through comparators 32,34 to produce parallel logic pulse outputs 54,54' (FIGS. 4c,4c') corresponding to signals whose amplitudes exceed positive and negative primary threshold values c and c' respectively (FIG. 4b). After passing through buffers 36,38 the signals 54,54' operate signal switched integrators 40,42 which accumulate values as described above to produce triangular pulse signals 56,56'. Those triangular signal amplitudes which exceed secondary threshold values established in comparators 44,46 activate appropriate oversized hole (48) and clump (50) defect alarm and counting means if in either case they exceed both prescribed intensity and size limits.

What is claimed is:

1. In an inspection system for web materials that includes electronic means responsive to means scanning the web for detecting defects in the web, said electronic means providing output signals representative of said defects, said signals having AC and DC components, the improvement comprising: a signal amplitude discriminator circuit coupled to said electronic means, said circuit including means for extracting the DC component of said signals and providing an AC signal output; first and second comparator means operating in parallel for processing said AC signal output, each comparator producing a set of logic pulse output signals, one set of logic pulse output signals from said first comparator exceeding a positive preset primary threshold value, the other set of logic pulse output signals from said second comparator exceeding a negative preset primary threshold value; first and second signal switched integrators coupled to the first and second comparator means respectively and operated by said logic pulse output signals for integrating said logic pulse output signals for the duration of each of said logic pulse output signals and for producing a signal amplitude proportional to each of said logic pulse output signals; and means coupled with each integrator means for comparing the amplitude of said integrated values of said logic pulse output signals with preselected secondary threshold values and signalling when the amplitude of said integrated values of said logic pulse output signals exceeds said preselected secondary threshold values.

2. The system as defined in claim 1, said system being a flying spot inspection system for web materials that includes a radiation source, a means for traversing a beam of radiation from said source in a scan across the web, said electronic means being responsive to the transmission of said beam of radiation through said web for detecting defects of the nature of fiber clumps and oversized holes in the web and providing output signals representative thereof.

3. The system defined in claim 1, said circuit means for extracting the DC component of said signals comprising: an amplifier having an output; a follower having an input; a charging circuit connected between the amplifier and follower, said charging circuit including a capacitor connected between the output of the amplifier and the input of the follower; a resistor being connected between the input of the follower and ground; and an electronic switch connected from the input of said follower to ground, said switch being operated in timed relationship with said signals.

* * * * *